United States Patent Office 3,141,334
Patented July 21, 1964

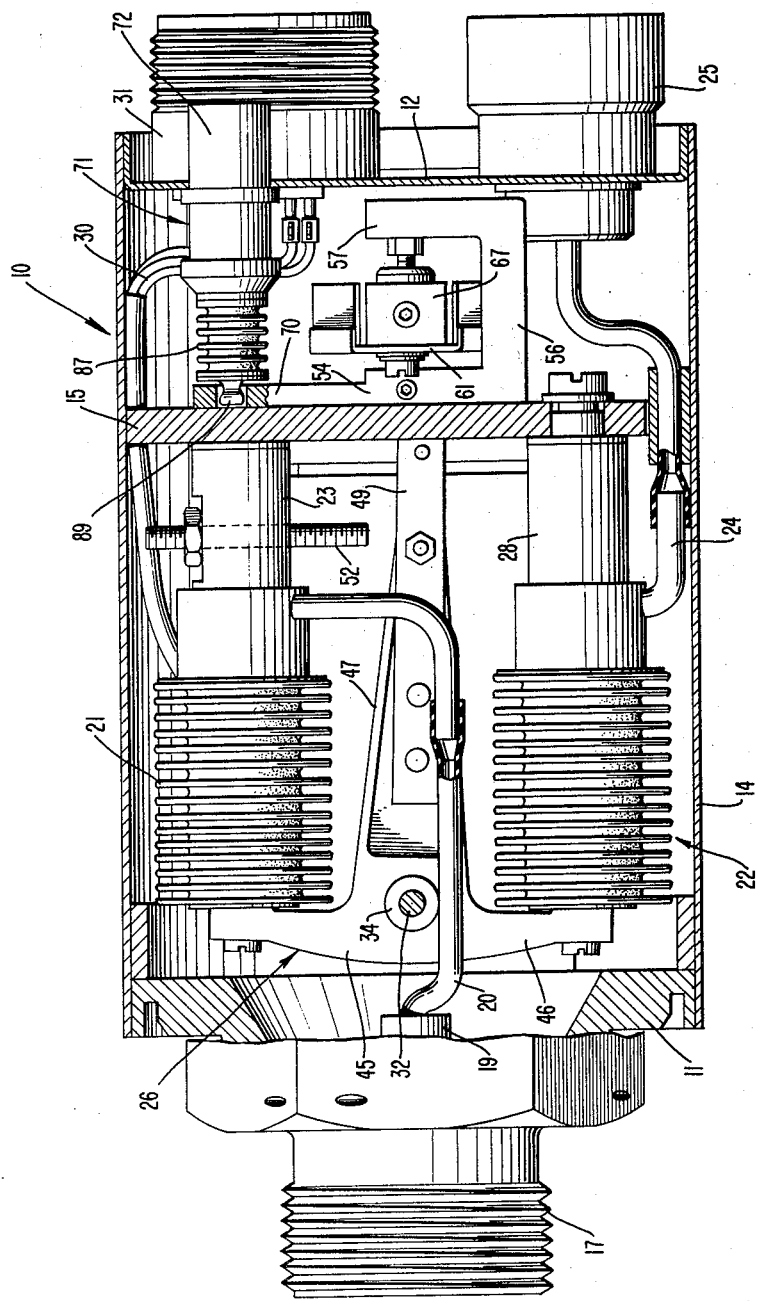

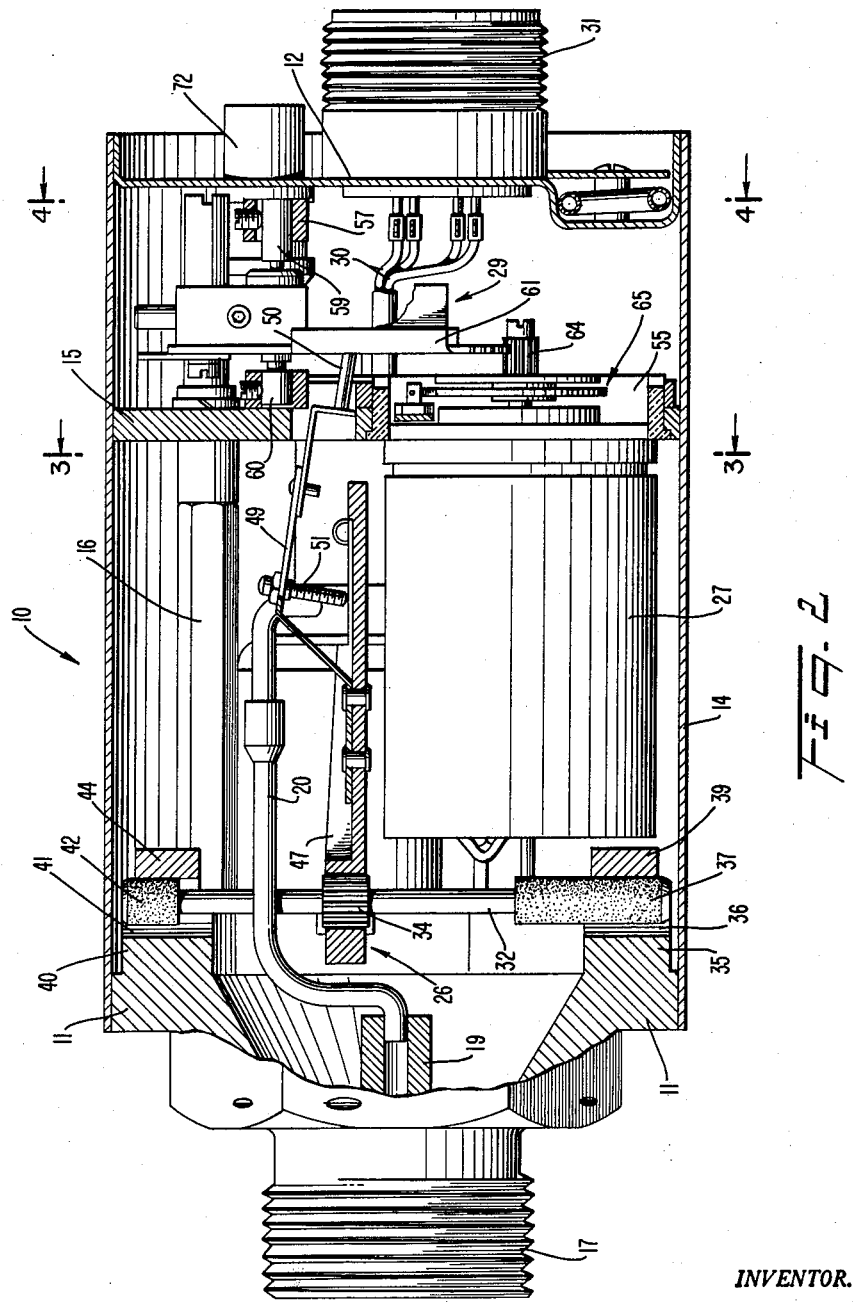

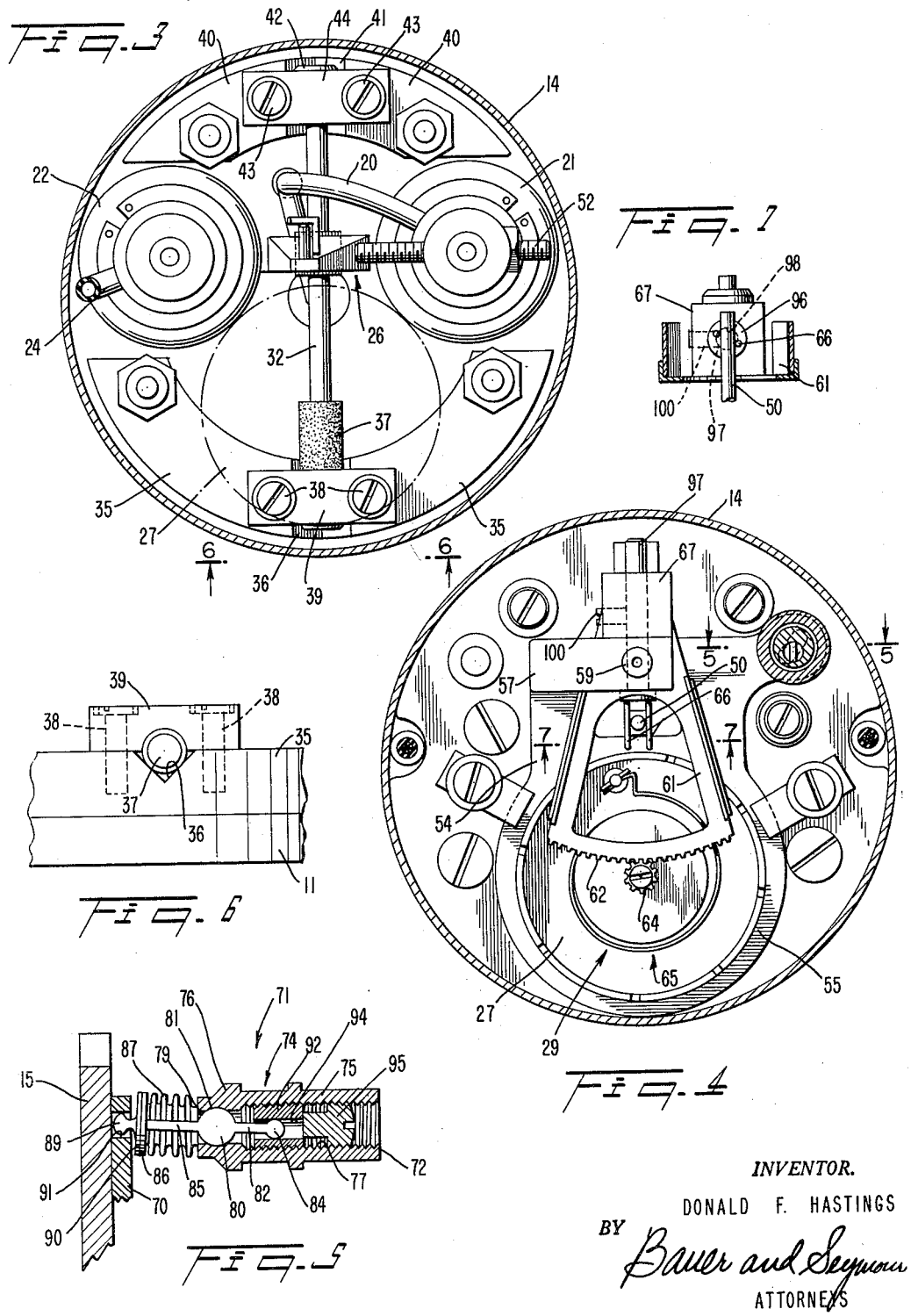

3,141,334
PRESSURE DETECTING INSTRUMENT
Donald F. Hastings, Suffern, N.Y., assignor to The Bendix Corporation, Montrose, Pa., a corporation of Delaware
Filed Oct. 14, 1960, Ser. No. 62,784
3 Claims. (Cl. 73—410)

This invention relates to a measuring instrument having an arm displaceable from an initial or zero position, said arm being spring biased against movement from such position. More particularly, the invention relates to a novel arm mounting and biasing means.

The invention is shown herein in connection with a pressure measuring instrument, as, for example, an oil pressure gauge for use with an internal combustion engine, jet engine, or the like. It will be obvious, however, that the invention may be employed to advantage with instruments of different types from the pressure gauge mechanism shown by way of illustration.

In prior apparatus of the type shown, a pressure responsive arm has been mounted on the frame of the instrument and spring biased against movement from its zero position by either a coil compression or a coil tension spring. Such prior apparatus was not altogether satisfactory in yielding accurate pressure measurements over appreciable periods of use because of hysteresis of the spring. When instruments of the above-described type are mounted in proximity to a device such as an engine which vibrates appreciably, the biasing springs of such instruments are adversely affected by the vibration, as is also true of the mechanism in the instrument which pivotally mounts the arm. Both of such actions seriously detract from the accuracy of the instrument, the former defect being generally the more serious since the usual instrument spring has a low resonant frequency lying well within the range of frequency of vibration of the engine. A still further defect of the instrument is caused by the fact that the arm biased by a coil compression or coil tension spring displays poor linearity over the range of measurements for which the instrument is designed.

It is accordingly among the objects of the present invention to provide a force-measuring instrument provided with a novel measuring arm suspension which is but little affected by subjection to vibration.

A further object of the invention lies in the provision of a force-measuring instrument having a measuring arm which is biased toward its zero position by a novel spring member, which has a very small hysteresis, so that the instrument accurately returns to zero position when unloaded.

Yet another object of the invention resides in the provision of a novel pressure-measuring instrument wherein the arm-biasing spring has a high resonant frequency, so that it is but little affected by being subjected to normal engine vibrations, wherein the arm-biasing spring means has an excellent linearity over the measuring range for which the instrument is designed, and wherein the measuring arm, the suspension means for the arm, and the biasing means for the arm present a substantially balanced construction.

A still further object of the invention lies in the provision of a novel simple rugged and economical force-measuring instrument of the type described.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in longitudinal generally axial section through the illustrative instrument, the section being taken in a plane displaced 90° from the sectioning plane of FIG. 2, certain of the parts being shown in side elevation;

FIG. 2 is a view in longitudinal generally axial section through the illustrative instrument, the section being taken in a plane displaced 90° from the sectioning plane of FIG. 1, certain of the parts being shown in side elevation;

FIG. 3 is a view in transverse section through an intermediate portion of the instrument, the section being taken generally along the line 3—3 of FIG. 2, the synchronous generator of the instrument being shown in phantom lines for clarity of illustration;

FIG. 4 is a view in transverse section through the instrument showing the driving mechanism between the measuring arm and the generator, the section being taken along the line 4—4 of FIG. 2;

FIG. 5 is a fragmentary view in longitudinal section through the means for adjusting the instrument to its initial or zero position, certain of the parts being shown in side elevation, the section being taken along line 5—5 of FIG. 4;

FIG. 6 is a fragmentary view in side elevation of a portion of the frame of the instrument at one of the means for clampingly retaining an end of the torque rod mounting the measuring arm of the instrument; and FIG. 7 is a fragmentary view in cross section of the driving mechanism for the indicating device, the section being taken along line 7—7 of FIG. 4.

The instrument shown by way of illustration, which is generally designated by the reference character 10, is adapted for use in measuring the oil pressure of an engine and for transmitting the reading of the pressure in the form of a signal from a synchronous generator or "synchro" to an appropriate visually read meter or recording device (not shown). The instrument shown, which is designed for mounting in proximity to an engine, is mounted in an hermetically sealed casing formed of a transverse head member 11, an end or bottom member 12, and a circular cylindrical shell 14 which is edge-welded to members 11 and 12. Head member 11 forms a portion of the frame of the instrument, there being a further transverse plate member 15 mounted within casing 14 and rigidly connected to member 11 by a series of spaced columns 16 having their ends connected to members 11 and 15 as shown.

Member 11 is provided with an inlet fitting 17 to which the lubricating oil under pressure for the engine is led. Fitting 17 communicates with a sleeve 19 integrally connected thereto inwardly of the casing, a flexible tube 20 leading from the sleeve 19 to the fixed base portion of a first longitudinally expansible chamber in the form of a bellows 21 having a thin circumferentially pleated wall. Chamber 21 has one end thereof fixedly secured to transverse member 15 by a base member 23. Chamber 21 expands longitudinally upon increase of pressure in the fluid fed thereto, and decreases in length when such fluid pressure decreases. The movable end of bellows 21 is connected to a first arm 45 of a measuring lever 26, to be described. The instrument shown is designed to yield a pressure reading equal to the amount which the pressure of the fluid exceeds atmospheric pressure. There is therefore provided within the housing a second expansible chamber 22 which is identical with chamber 21 but the interior of which communicates with the atmosphere through a tube 24 connected to the fixed end thereof, the outer end of such tube opening through end closure member 12 within an open ended protective hood 25. Chamber 22 has one end thereof fixedly mounted to member 15 through a support 28 affixed to such member, as shown. The movable end of chamber 22 is connected to a second, oppositely disposed arm 46 of the measuring lever 26, so that the expansive forces operative upon chambers 21 and 22 are always in opposition.

The measuring lever 26, which is mounted for oscillation about the axis of a torque rod 32, is drivingly connected to a synchronous generator or "synchro" 27 through motion-multiplying mechanism 29. The angular displacement of lever 26 is thus reflected in rotation of the rotor of the synchro, the output of the synchro being led to a suitably calibrated instrument. The output wires 30 on the synchro are brought to a first fixed part 31 of a separable electrical connector which is secured and sealed to the end member 12 of the casing.

The novel mounting and biasing means for the lever 26 is shown in FIGS. 1, 2, 3, and 6. Such means includes a torque rod 32 extending diametrally of the casing adjacent end member 11, rod 32 serving both to allow the lever to pivot or oscillate through a limited range and also to oppose such oscillation from a central, at rest or zero position. Lever 26 has a thickened terminal hub portion which is inwardly grooved to receive an enlarged splined intermediate portion of rod 32 to form a rigid connection therewith. Splined connection 34 may be made by press fitting the parts together.

Opposed portions of end member 11 extend inwardly of the casing somewhat to form ears 35 and 40. Each of such ears is provided with a V groove which converges in the direction of the main portion of member 11, the groove in ear 35 being designated 36 and that in ear 40 being designated 41. Opposite ends of torque rod 32 are enlarged at 37 and 42, so as to be clamped within the V grooves 36 and 41. To improve the gripping engagement between the parts, it is preferred that enlargements 37 and 42 be roughened as by being sandblasted before being assembled in the instrument. The torque rod is retained in the position shown by means of strap-like members which bridge the ends of the V grooves, and press the ends of the torque rods firmly into such grooves. The strap member-engaging enlarged end 37 of the rod, designated 39, is retained on ear 35 by machine screws 38; the member 44 retaining enlarged end 42 of rod 32 is retained on ear 40 by machine screws 43. The described structure retains the ends of torque rod 32 from turning with respect to the frame of the instrument, so that turning of measuring lever 26 from its neutral or zero position causes rod 32 to twist. Rod 32, therefore, functions both to mount lever 26 for pivotal movement and also constantly to spring bias it toward its zero position.

The measuring lever 26 is generally of T shape, the two previously described arms 45 and 46 forming the top of the T. Lever 26 has a main generally radially-extending arm 47 through which connection is made by way of the mechanism 29 to the synchro 27. Arm 47 has a lower end portion 49 in the form of a spring metal strap carrying a driving pin 50. The position of pin 50 relative to the axis of the casing, whereby to adjust the ratio of motion-multiplication afforded by mechanism 29, may be changed within limits by the adjusting stud 51. An adjustable stop for lever 47 is provided in the form of a threaded stud 52 positioned in a threaded bore in bellows-supporting member 23, as shown in FIG. 1.

The motion-multiplying mechanism 29 includes an oscillatable plate member 54 which is mounted parallel to intermediate supporting plate 15 and is rotatably secured thereto by a journal bearing 55. The synchro 27, as shown in FIG. 2, has the casing thereof connected to end plate member 15 so that it may be adjusted about the axis of the synchro and then held fixedly with respect thereto. Plate 54 has a longitudinal extension 56 (FIG. 1) and an overarm 57 connected thereto. Between the main portion of plate member 54 and the overarm 57 there is pivotally mounted a sector member 61. Member 61 is carried upon pintle pins 59 and 60 in overarm 57 and the main portion of plate member 54, respectively, as shown in FIG. 2.

Sector member 61 has a sector gear 62 thereon meshing with a pinion 64 on the end of the shaft of the synchro 27. A helically wound hairspring 65, connected at its outer end to a post on plate member 54 and at its inner end to the shaft of the synchro 27, maintains the teeth of sector gear 62 and pinion 64 in contact at all times. It will be apparent that a relatively small angular motion of sector 61 will result in a very considerable angular motion of the rotor of synchro 27. Sector 61 is driven by the aforesaid pin 50, such pin being accurately received between opposed parallel arms 66 affixed to sector 61. It will be seen that adjustment of the position of pin 50 relative to pintle pins 59 and 60 about which sector 61 oscillates will change the effective ratio of motion-multiplication between arm 47 and sector 61.

In the illustrative embodiment there is shown a simple effective mechanism whereby the instrument may be adjusted as required to an initial or zero setting without disturbing the hermetic seal of the casing of the instrument. Such adjustment is effected by rotating the casing and thus the stator of the syncho 27 relative to the rotor thereof by rotation of the plate 54 upon which the synchro is mounted. Plate 54 has a lateral extension arm 70 to which the zero adjusting means 71 is connected. The construction of means 71 and its relation to arm 70 will be more readily understood on consideration of FIGS. 1 and 5.

A hollow longitudinally-extending shell 72 is affixed and sealed to end closure member 12 as shown. Mounted within shell 72 and sealed thereto is an adjusting mechanism 74 including an inner shell 75 having an enlarged head 76 which extends inwardly of the main housing of the instrument and an outer end which is exposed to the atmosphere at the outer end of shell 72. Inner shell 75 has a threaded axial passage 77 therein at its intermediate and outer portions and a shallow ball seat 81 at its inner end. A longitudinally extending adjusting lever generally designated 79 has an intermediate ball member 80 mounted within ball seat 81. Adjusting lever 79 has a rear or outer arm 82 thereon, arm 82 terminating in a smaller ball 84. Lever 79 has a forwardly-extending arm 85 which is attached at its outer end to the inner end member 86 of a sealing pleated bellows 87. The outer or rear end of bellows 87 is sealed to the inner end of the inner shell member 75. Secured to member 86 is a second similar member 90 which has an inwardly projecting ball 89 positioned centrally thereof. Ball 89 fits within an angularly directed slot 91 in arm 70, the direction of slot 91 being such that oscillation of ball 89 in a vertical plane (FIGS. 4 and 5) will cause oscillation of member 54 about journal 55.

Oscillation of adjusting lever 79 from a position external of the housing of instrument 10 is effected by an externally threaded internal nut 92 which is threadedly received in bore 77 of shell 75. Nut 92 has an eccentrically disposed longitudinally-extending bore 94 therein, such bore accurately receiving the ball 84 on the outer arm of adjusting lever 79. Nut 92 may be turned, after removal of the protective plug 95, as by inserting a screw driver into slots on the outer end of the nut. After the nut has been turned sufficiently to turn the rotor of the synchro to the desired zero position, the nut 92 may be locked in place by reinserting the protective plug 95. The flexible bellows 87 permits the required motion of adjusting lever 79 and thus of ball 89, while preserving an hermetic seal across the inner end of the shell 75.

In order substantially to eliminate play between driving pin 50 and the opposed parallel arms 66 affixed to sector 61, there is provided the following adjusting mechanism for arms 66. Such arms are in the form of parallel pins projecting inwardly from an enlarged head 96 on a rod-like member 97 which is rotatably mounted in a bore 98 in member 57. Pins 66 are spaced from each other a distance which slightly exceeds the diameter of driving pin 50. The rear end of member 97 projects rearwardly of member 57, so as to allow the rotation of the former by one's fingers when member 97 is free for rotation, so that play between pin 50 and each of pins 66 may be entirely taken up, as indicated in FIG. 7. A setscrew 100 threaded into member 57 and intersecting bore 98 permits member 97 to be securely retained in its thus adjusted position.

Although only one embodiment of the invention has been illustrated in the accompanying drawings and described in the foregoing specification, it is to be expressly understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. In a pressure differential indicating device, a hermetically sealed casing, a pair of expansible chamber means in said casing and externally subjected to the pressure within the casing, means connecting the interiors of said chamber means to different sources of fluid pressure, a substantially rigid, torsionally-resilient bar fixedly secured adjacent each end thereof, lever means secured to said bar intermediate the ends of the latter, whereby said bar resiliently resists angular movement of the lever means about the axis of the bar in either direction from a null position determined by the relaxed position of the bar, means for operatively so connecting said pair of chamber means to said lever means that fluid pressure within one of said chamber means tends to twist said bar in one direction about its axis and pressure within the other chamber means simultaneously tends to twist said bar in the opposite direction, whereby the bar is subjected to a torque determined by the differential between the pressures within said pair of chamber means, a synchronous generator having a rotor, means operatively connecting said lever means and rotor, whereby angular movement of the rotor by said lever means is indicative of the degree and direction of twist of said bar from said relaxed position thereof, and means rotatable from outside the sealed casing for adjusting said connecting means to effect a zero setting of said rotor relative to said lever means.

2. An indicating device as defined in claim 1 wherein each of said chamber means comprises a resilient bellows.

3. An indicating device as defined in claim 1 wherein said lever means comprises arms extending radially from said bar at opposite sides thereof in a common transverse plane.

References Cited in the file of this patent

UNITED STATES PATENTS

| | | |
|---|---|---|
| 1,827,560 | Binckley | Oct. 13, 1931 |
| 2,365,573 | McGay | Dec. 19, 1944 |
| 2,625,820 | Whitehead et al. | Jan. 20, 1953 |
| 2,707,397 | Grover | May 3, 1955 |
| 2,788,664 | Coulbourn et al. | Apr. 16, 1957 |
| 2,816,444 | Gomez | Dec. 17, 1957 |